Oct. 4, 1932.   L. H. DEBS   1,880,865
MULTIPLE BAKING PAN
Filed Dec. 1, 1930   2 Sheets-Sheet 1
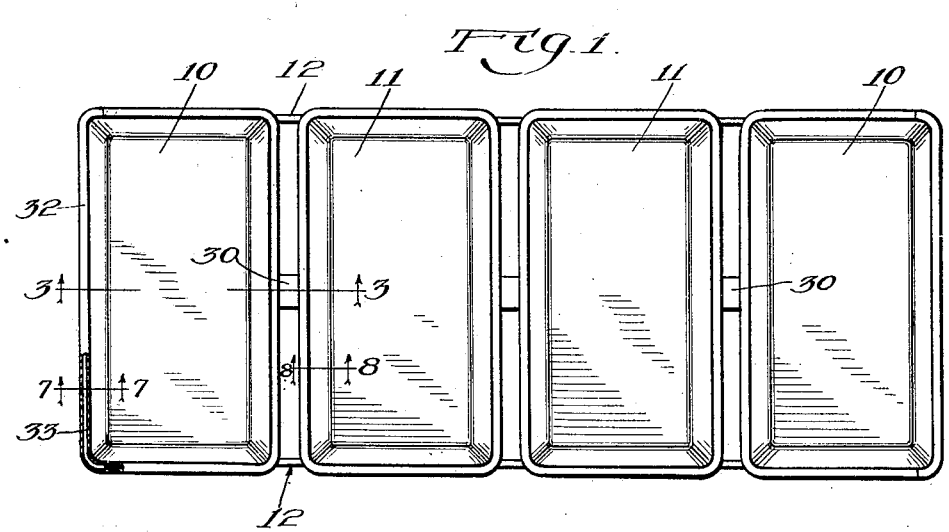
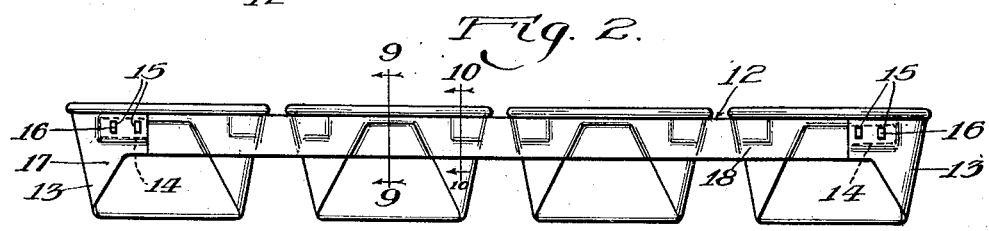
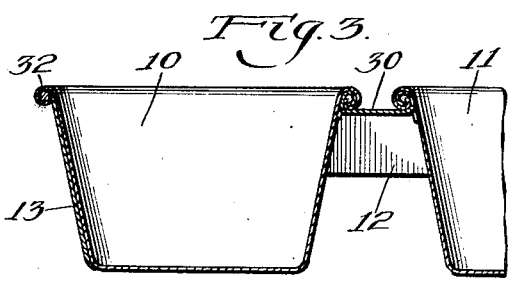
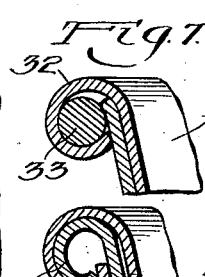
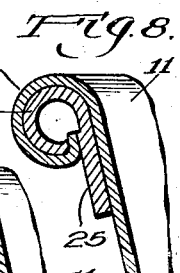
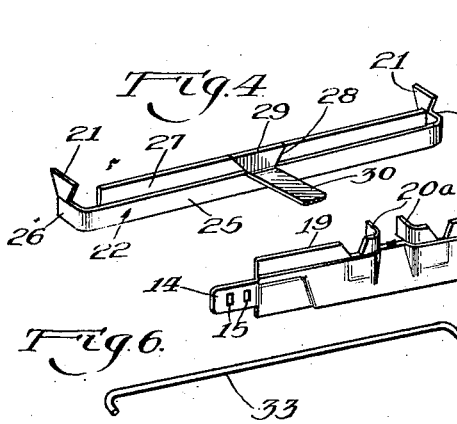
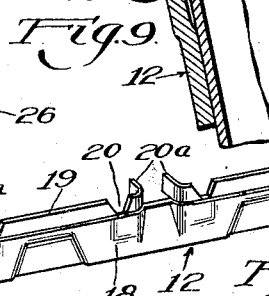
Inventor:
Louis H. Debs,

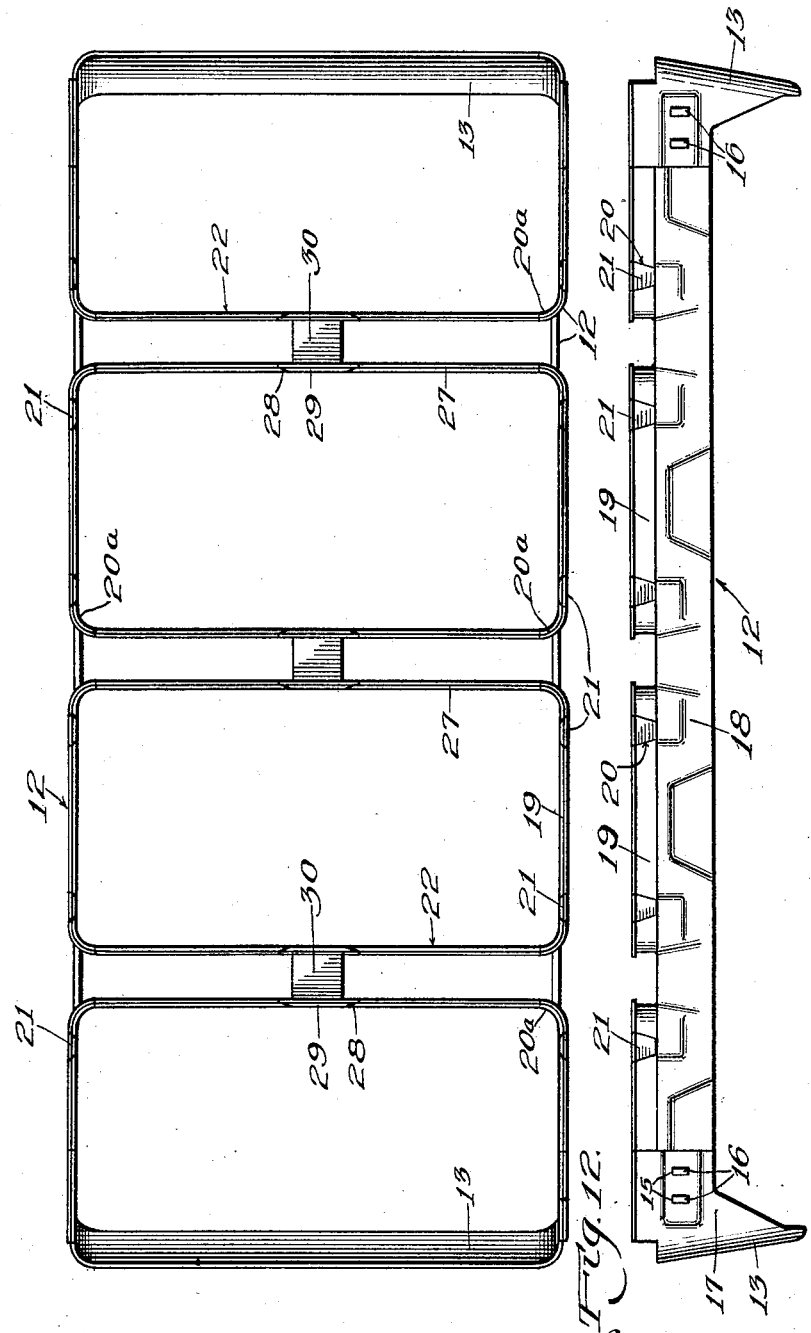

Patented Oct. 4, 1932

1,880,865

UNITED STATES PATENT OFFICE

LOUIS H. DEBS, OF CHICAGO, ILLINOIS

MULTIPLE BAKING PAN

Application filed December 1, 1930. Serial No. 499,387.

The invention relates to multiple baking pans, and has as its primary object the provision of a multiple baking pan which is rigid and durable in construction.

One form of the invention is embodied in a multiple pan which comprises a series of baking pans having their ends rigidly secured to end straps. Secured to the end straps and disposed against the outer side surfaces of the end pans of the series are protector plates which extend up into wired edges provided on the outer surfaces of the end pans of the series. Intermediate the pans and extending from one end strap to the other are re-enforcing members which have their upper edges rolled into the rims of the pans. Strut members are provided intermediate the side surfaces of the adjacent pans, these strut members having their ends rolled into the rims of the pans to hold them in place. The re-enforcing and strut members are carried by the pans in such manner that it is not necessary to secure them to the frame which is formed by the end straps and the protector plates.

Other objects and advantages of the invention will become apparent as the following detailed description progresses, reference being had to the accompanying drawings, wherein:

Figure 1 is a plan view of a multiple pan which embodies the invention.

Fig. 2 is an end view of the improved pan.

Fig. 3 is an enlarged section taken on line 3—3 of Fig. 1.

Fig. 4 is a perspective view of a re-enforcing member which forms part of the improved pan, the re-enforcing member being shown in connection with a strut member which extends between adjacent pans of the series.

Fig. 5 is a perspective view of one of the end straps provided in the improved pan, the end strap being shown as it appears before it is assembled with the pan.

Fig. 6 is a perspective view of one of a pair of re-enforcing wires which form parts of the improved construction.

Fig. 7 is an enlarged section taken on line 7—7 of Fig. 1.

Fig. 8 is an enlarged section taken on line 8—8 of Fig. 1.

Fig. 9 is an enlarged section taken on line 9—9 of Fig. 2.

Fig. 10 is an enlarged section taken on the line 10—10 of Fig. 2.

Fig. 11 is a plan view of the frame and re-enforcing strips as they appear assembled before the pans are assembled therewith, and Fig. 12 is an end elevation of the assembled structure shown in Fig. 11.

Referring to the drawings, wherein a preferred embodiment of the invention is illustrated, it will be noted that the improved multiple baking pan comprises two end pans 10 and intermediate pans 11, the several pans being spaced from each other so that heated air may flow up between the pans. Disposed along the ends of the pans 10 and 11 are end straps which are secured to protector plates 13 covering the outer sides of the end pans 10. Tabs 14 provided at the ends of the end straps 12 have lugs 15 struck up therefrom, the lugs 15 being adapted to project through apertures 16 provided in flanges 17 formed integral with the protector plates 13. The outer ends of the lugs 15 are riveted over to secure the end straps to the protector plates.

As best shown in Figs. 5 and 9, the end straps comprise body portions 18 which are formed from sheet metal. Formed integral with the each body portion 18 are a plurality of upwardly extending flanges 19, one of the flanges 19 being provided for each of the adjacent pans 10 and 11. The flanges 19 at the ends of the body portion 18 are shorter than the intermediate flanges 19. The purpose of this construction will presently appear. The flanges 19 are thinner than the body portion 18 and are provided with notches 20 adapted to receive flaring tongues 21 provided upon re-enforcing members 22 which extend between the end straps 12. The ends of the flanges 19 are provided with inwardly extending lugs 20a, the intermediate flanges 19 being provided with two of these lugs and each of the end flanges 19 being provided with a single lug of this character.

Each of the re-enforcing members 22 comprises a body portion 25 having lugs 26 bent at right angles thereto. Formed integral with the body portion 25 intermediate its ends is an upwardly extending flange 27 which is thinner than the body portion and is provided with a notch 28 adapted to receive one of a pair of flaring tongues 29 provided on each of a plurality of strut members 30 extending between adjacent pans. It will be noted that the flaring tongues 21 are formed upon the lugs 26 and that they are thinner than the body portion 25.

The outer side rim of each of the end pans 10 is provided with a wired edge 32 which extends around on the ends of these pans. For this purpose, U-shaped re-enforcing wires 33 are provided, which wires rest against the outer surfaces of the protector plates 13 (see Fig. 7).

Figs. 11 and 12 show the end straps 12, the re-enforcing members 22 and the strut members 30 as they appear assembled before the pans 10 and 11 have been secured thereto. It will be noted that the flaring tongues 21 of the re-enforcing members 22 are seated in the notches 20 of the end straps 12 and that the flaring tongues 29 of the strut members 30 are seated in the notches 28 of the re-enforcing members 22. The flanges 19 and 27 and the flaring tongues 21 and 29 project upwardly and form continuous rims for each of the intermediate pans 11 and form rims for the inner side edges and portions of the end edges of the end pans 10, the outer side edges of the end pans and portions of the end rims of these pans being wired by means of the U-shaped wires 33.

The flanges 19 and 27 and the flaring tongues 21 and 29 are rolled into flanges 38 provided at the upper edges of the pans 10 and 11 (see Figs. 3, 8, 9 and 10), the flanges 38 along the upper edges of the outer side surfaces of the end pans 10 being rolled around the U-shaped wires 33 (see Fig. 7).

It will be noted that the intermediate pans 11 are provided with two re-enforcing members extending along the side edges thereof, the re-enforcing members having lugs which engage the ends of the pans. These re-enforcing members are carried by the pans and are not secured to the end straps, the function of the re-enforcing members being to prevent elongation or crushing of the pans longitudinally thereof. Each of the end pans 10 is provided with a re-enforcing member along its inner side surfaces, the outer side surfaces being re-enforced by the U-shaped wires as well as by the protector plates. The strut members are carried by the pans themselves and are not secured to the re-enforcing members.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A device of the kind described comprising a series of pans having rims, end straps secured to the ends of the pans, re-enforcing members extending between the end straps intermediate the pans and having flanges rolled in the rims of said pans, and strut members intermediate the pans, said strut members having their ends rolled in the rims of the pans.

2. A device of the kind described comprising a series of pans having rolled rims, end straps disposed along the ends of the pans and provided with notched flanges rolled in the end rims of said pans, said flanges being provided with tongues rolled in the rims of the corners of the intermediate pans, and re-enforcing members having flanges rolled in the side rims of the intermediate pans and provided with tongues rolled in the end rims of the pans, said tongues on said re-enforcing members being disposed in the notches in said flanges in said end straps.

3. A device of the kind described comprising a series of pans having rolled rims, end straps disposed along the ends of the pans and provided with notched flanges rolled in the end rims of said pans, said flanges being provided with tongues rolled in the rims of the corners of the intermediate pans, re-enforcing members having flanges rolled in the side rims of the intermediate pans and provided with tongues rolled in the end rims of the pans, said tongues on said re-enforcing members being disposed in the notches in said flanges in said end straps, and strut members disposed intermediate the pans and having their ends rolled in the side rims of the pans.

4. A device of the kind described comprising a series of pans having rolled rims, end straps disposed along the ends of the pans and provided with flanges rolled in said rims of said pans, re-enforcing members extending along the entire side edges of the intermediate pans and provided with notched flanges rolled in the side rims of said intermediate pans, and strut members having their ends disposed in the notches in said re-enforcing members and having said ends rolled in the side rims of said intermediate pans.

5. A device of the kind described comprising a series of pans having rolled rims, end straps disposed along the ends of the pans and provided with flanges rolled in the rims of said pans, and re-enforcing members extending along the entire sides of the intermediate pans and having flanges rolled in the side rims of said intermediate pans, said re-enforcing members having tongues rolled in the end rims of said intermediate pans at points spaced from the corners of said pans.

6. A device of the kind described comprising a plurality of pans having rolled rims, end straps disposed along the ends of the pans and provided with flanges rolled in the rims of the pans, and re-enforcing members extending along the entire inner sides of the end pans and having flanges rolled in the rims of said inner sides, said re-enforcing members having tongues rolled in the end rims of said end pans at points spaced from the corners of said end pans.

7. A device of the kind described comprising a plurality of pans having rolled rims, end straps disposed along the ends of the pans and provided with flanges rolled in the rims of said pans, re-enforcing members extending along entire side edges of said pans and provided with flanges rolled in the rims of said side edges, said re-enforcing members having notches therein, and said members having their ends disposed in said notches and having said ends rolled in the rims of said pans.

In testimony whereof, I hereunto subscribe my name, this 24th day of November, 1930.

LOUIS H. DEBS.